(12) United States Patent
Chatterjee et al.

(10) Patent No.: US 11,182,724 B2
(45) Date of Patent: Nov. 23, 2021

(54) ESTIMATION OF PER-APPLICATION MIGRATION PRICING AND APPLICATION MOVE GROUP SEQUENCE FOR CLOUD MIGRATION

(71) Applicant: Tata Consultancy Services Limited, Mumbai (IN)

(72) Inventors: Soumya Chatterjee, Kolkata (IN); Abhijit Gangopadhyay, Kolkata (IN); Debabrata Mondal, Kolkata (IN); Sthitadhee Chatterjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 16/889,493

(22) Filed: Jun. 1, 2020

(65) Prior Publication Data
US 2021/0065090 A1    Mar. 4, 2021

(30) Foreign Application Priority Data
Aug. 30, 2019   (IN) .............................. 201921035122

(51) Int. Cl.
| | |
|---|---|
| *G06Q 10/06* | (2012.01) |
| *G06Q 10/04* | (2012.01) |
| *G06Q 30/02* | (2012.01) |
| *G06Q 30/00* | (2012.01) |
| *G06N 3/00* | (2006.01) |
| *G06N 3/04* | (2006.01) |
| *H04L 29/08* | (2006.01) |

(52) U.S. Cl.
CPC ....... *G06Q 10/06375* (2013.01); *G06N 3/006* (2013.01); *G06N 3/0454* (2013.01); *G06Q 10/04* (2013.01); *G06Q 10/06316* (2013.01); *G06Q 30/018* (2013.01); *G06Q 30/0206* (2013.01); *H04L 67/1023* (2013.01)

(58) Field of Classification Search
None
See application file for complete search history.

(56) References Cited

U.S. PATENT DOCUMENTS

| | | | |
|---|---|---|---|
| 8,745,233 B2 | 6/2014 | Bartfai-Walcott et al. | |
| 10,764,370 B2 * | 9/2020 | Srinivasan | G06F 9/5072 |

(Continued)

FOREIGN PATENT DOCUMENTS

CN            104063261           9/2014

*Primary Examiner* — Sujay Koneru
(74) *Attorney, Agent, or Firm* — Finnegan, Henderson, Farabow, Garrett & Dunner LLP

(57) ABSTRACT

This disclosure relates generally to cloud migration strategy and, more particularly, to estimation of per-application migration pricing and application move group sequence for cloud migration. The per-application migration pricing is the cost incurred to migrate an application from an organization's infrastructure to a cloud and the application move group sequence is an optimized application movement sequence from an organization's infrastructure to a cloud. The method and system propose to estimate the per-application pricing for cloud based on a set of optimization techniques and neural networks. Further the application move group sequence for cloud migration is estimated based on a forest poly tree optimization, a fuzzy ant colony optimization, a triangular fuzzy optimization and a plurality of pre-defined priorities.

10 Claims, 6 Drawing Sheets

(56) References Cited

U.S. PATENT DOCUMENTS

| | | | | |
|---|---|---|---|---|
| 2010/0332629 | A1* | 12/2010 | Cotugno | H04L 67/34 |
| | | | | 709/221 |
| 2012/0137285 | A1 | 5/2012 | Glikson et al. | |
| 2014/0279201 | A1 | 9/2014 | Iyoob et al. | |
| 2016/0019636 | A1* | 1/2016 | Adapalli | H04L 47/70 |
| | | | | 705/26.62 |
| 2016/0036655 | A1* | 2/2016 | Burton | H04L 41/5029 |
| | | | | 709/223 |
| 2016/0094483 | A1* | 3/2016 | Johnston | H04L 67/10 |
| | | | | 709/226 |
| 2016/0292013 | A1* | 10/2016 | Li | G06F 9/4881 |
| 2017/0017505 | A1* | 1/2017 | Bijani | G06F 9/44594 |
| 2017/0177895 | A1* | 6/2017 | McHale | G06F 16/122 |
| 2017/0373935 | A1* | 12/2017 | Subramanian | G06F 9/4856 |
| 2019/0182323 | A1* | 6/2019 | Srinivasan | G06F 9/4856 |
| 2019/0253485 | A1* | 8/2019 | Banerjee | H04L 67/1097 |
| 2019/0317952 | A1* | 10/2019 | Li | G06F 16/287 |
| 2020/0005136 | A1* | 1/2020 | Spryn | G06N 3/0454 |
| 2020/0125568 | A1* | 4/2020 | Idicula | G06F 16/24545 |
| 2020/0184556 | A1* | 6/2020 | Celia | G06Q 10/0639 |
| 2020/0267216 | A1* | 8/2020 | Haggart | H04L 67/1097 |
| 2020/0304571 | A1* | 9/2020 | Ranjan | G06F 3/0649 |
| 2020/0314175 | A1* | 10/2020 | Dailianas | G06F 9/5088 |
| 2020/0348662 | A1* | 11/2020 | Cella | G05B 23/024 |
| 2021/0065090 | A1* | 3/2021 | Chatterjee | G06N 3/006 |

\* cited by examiner

ESTIMATION OF PER-APPLICATION MIGRATION PRICING AND APPLICATION MOVE GROUP SEQUENCE FOR CLOUD MIGRATION

CROSS-REFERENCE TO RELATED APPLICATIONS AND PRIORITY

The present application claims priority from Indian non-provisional specification no. 201921035122 filed on 30 Aug. 2019.

TECHNICAL FIELD

The disclosure herein generally relates to field of cloud migration strategy and, more particularly, to estimation of per-application migration pricing and application move group sequence for cloud migration.

BACKGROUND

Cloud computing involves delivery of a variety of computing services including servers, storage, databases, networking, software, analytics, and intelligence over "cloud" or "internet". Cloud computing offers various benefits such as flexible resources, faster innovation, economies of scale, on-demand services, elasticity, reliability, high scalability, security, performance and costs.

Considering multiple advantages offered by cloud computing, several organizations are migrating their applications on to a cloud computing environment and imbibing cloud based managed services for low maintenances, modernizing and building of cloud native applications. The process of moving data, applications or other business elements to a cloud computing environment is referred to as cloud migration.

Cloud computing has several advantages, however cloud migration is a challenging task considering complexity, feasibility and compatibility of numerous applications that need to be migrated for an organization. Since cloud migration involves migration of in-house infrastructure to an external computing environment, it is crucial to understand challenges of cloud migration and mitigate them to ensure an efficient cloud migration of applications without affecting the critical business functioning of the organization.

One of the challenges of cloud migration is computing cost/price of cloud migration, especially computing per-application migration price that is migration is the cost that would be incurred to migrate an application from an organization's infrastructure to a cloud, as there is a tendency to underestimate the expenses incurred. Further another challenge during cloud migration is to determine the sequence of application movement to the cloud considering a plurality of factors that include application dependency, relationship and other factors associated with other applications and the organization.

SUMMARY

Embodiments of the present disclosure present technological improvements as solutions to one or more of the above-mentioned technical problems recognized by the inventors in conventional systems. For example, in one embodiment, a method and system estimation of per-application migration pricing and application move group sequence for cloud migration is provided. The per-application migration pricing is the cost incurred to migrate an application from an organization's infrastructure to a cloud and the application move group sequence is an optimized application movement sequence from an organization's infrastructure to a cloud. The method and system propose to estimate the per-application pricing for cloud based on a set of optimization techniques and neural networks. Further the application move group sequence for cloud migration is estimated based on a forest poly tree optimization, a fuzzy ant colony optimization, a triangular fuzzy optimization and a plurality of pre-defined priorities.

In another aspect, a method for estimation of per-application migration pricing and application move group sequence for cloud migration is provided. The method includes receiving a plurality of applications for cloud migration. The method further includes receiving a plurality of per-application migration pricing input parameters for the received plurality of applications for cloud migration. The method further includes receiving a plurality of application move group sequence input parameters corresponding to the received plurality of applications for cloud migration. The method further includes estimating the per-application pricing for cloud migration for each of the received plurality of applications using the received plurality of per-application pricing input parameters based on a set of optimization techniques and neural networks. The method further includes estimating the application move group sequence for cloud migration for each of the received plurality of applications based on plurality of optimization techniques that include a forest poly tree optimization, a fuzzy ant colony optimization, a triangular fuzzy optimization and a plurality of pre-defined priorities. The method further includes displaying the estimated per-application migration pricing and the estimated application move group sequence for cloud migration on a display module.

In another aspect, a system for estimation of per-application migration pricing and application move group sequence for cloud migration is provided. The system comprises a memory storing instructions and a centralized database, one or more communication interfaces; and one or more hardware processors coupled to the memory via the one or more communication interfaces, wherein the one or more hardware processors are configured by instructions to include comprises an input module configured for receiving a plurality of inputs that include a plurality of applications for cloud migration, a plurality of per-application migration pricing input parameters for the received variety of applications for cloud migration and a plurality of application move group sequence input parameters corresponding to the received plurality of applications for cloud migration. The system further comprises a per-application pricing estimation module that is configured for estimating the per-application pricing for cloud migration for each of the received plurality of applications using the received plurality of per-application pricing input parameters based on a set of optimization techniques and neural networks. The system further comprises an application move group sequence estimation module configured for estimating the application move group sequence for cloud migration for each of the received plurality of applications based on a forest poly tree optimization, a fuzzy ant colony optimization, a triangular fuzzy optimization and a plurality of pre-defined priorities. The system further comprises a display module configured for displaying the estimated per-application migration pricing and the estimated application move group sequence for cloud migration.

In yet another aspect, a non-transitory computer-readable medium having embodied thereon a computer readable program, wherein the computer readable program, when executed by one or more hardware processors, causes an estimation of per-application migration pricing and application move group sequence for cloud migration. The program includes receiving a plurality of applications for cloud migration. The program further includes receiving a plurality of per-application migration pricing input parameters for the received plurality of applications for cloud migration. The program further includes receiving a plurality of application move group sequence input parameters corresponding to the received plurality of applications for cloud migration. The program further includes estimating the per-application pricing for cloud migration for each of the received plurality of applications using the received plurality of per-application pricing input parameters based on a set of optimization techniques and neural networks. The program further includes estimating the application move group sequence for cloud migration for each of the received plurality of applications based on plurality of optimization techniques that include a forest poly tree optimization, a fuzzy ant colony optimization, a triangular fuzzy optimization and a plurality of pre-defined priorities. The program further includes displaying the estimated per-application migration pricing and the estimated application move group sequence for cloud migration on a display module.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
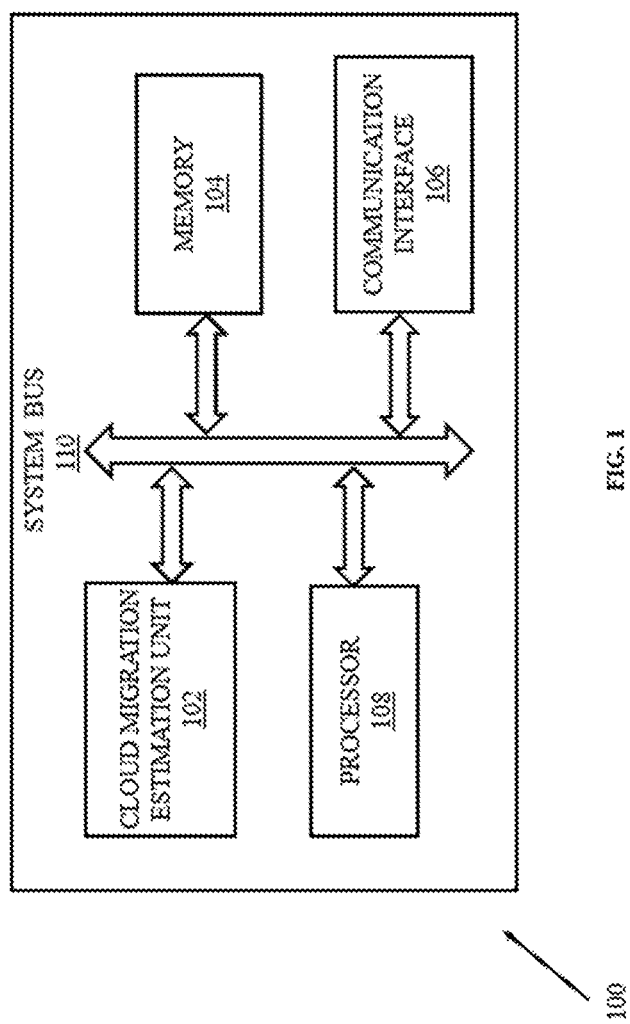
FIG. 1 illustrates an exemplary block diagram of a system for estimation of per-application migration pricing and application move group sequence for cloud migration in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Cloud migration is a process of moving applications or data or other business elements from an organization to a cloud computing environment.

Per-application migration pricing price for cloud migration is the cost that would be incurred to migrate an application from an organization's infrastructure to a cloud based on a nature of the application to be migrated and an experience repository (historic data). The nature of application includes parameters such as application type, platform preference, technology stack, minimal change migration, availability, scalability, integration, open source, multi cloud portability, security and modernization.

Application move group sequence for cloud migration an optimized application movement sequence from an organization's infrastructure to a cloud considering the application's dependency, relationship and other factors associated with other applications and the organization that include one or more of business group, dependent application, technically coupled application, business critical, business priorities platform preference, security and compliance, hardware ageing, software support timeline, timeline restriction, minimal change migration, availability, scalability and integration.

Referring now to the drawings, and more particularly to FIG. 1 through FIG. 5A and FIG. 5B, where similar reference characters denote corresponding features consistently throughout the figures, there are shown preferred embodiments and these embodiments are described in the context of the following exemplary system and/or method.

FIG. 1 is a block diagram of a system 100 for estimation of per-application migration pricing and application move group sequence for cloud migration, in accordance with an example embodiment. The system 100 includes a cloud migration estimation unit (102) for estimation of per-application migration pricing and application move group sequence for cloud migration. The cloud migration estimation unit (102) includes or is otherwise in communication with a memory (104), a communication interface (106), and a processor (108). The memory 104, communication interface (106), and the processor (108) may be coupled by a system bus (110) or a similar mechanism. Although FIG. 1 shows example components of cloud migration estimation unit (102), in other implementations, system 100 may contain fewer components, additional components, different components, or differently arranged components than depicted in FIG. 1.

The processor (108) may be implemented as one or more microprocessors, microcomputers, microcontrollers, digital signal processors, central processing units, state machines, logic circuitries, and/or any devices that facilitates in designing polymeric carrier for controlled release of molecules. Further, the processor (108) may comprise a multi-core architecture. Among other capabilities, the processor (108) is configured to fetch and execute computer-readable instructions or modules stored in the memory (104). The processor (108) may include circuitry implementing, among others, audio and logic functions associated with the communication. For example, the processor (108) may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor (108) thus may also include the functionality to encode messages and/or data or information. The processor (108) may include, among other things, a clock, an arithmetic logic unit (ALU) and logic gates configured to support operation of the processor (108). Further, the processor (108) may include functionality to execute one or more software programs, which may be stored in the memory (104) or otherwise accessible to the processor (108).

The memory (104), may store any number of pieces of information, and data, used by the system 100 to implement the functions of the system 100. The memory (104) may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Examples of volatile memory may include but are not limited to volatile random access memory (RAM). The non-volatile memory may additionally or alternatively comprise an electrically erasable programmable read only memory (EEPROM), flash memory, hard drive, or the like. The memory (104) may be configured to store information, data, applications, instructions or the like for enabling the system 100 to carry out various functions in accordance with various example embodiments. Additionally, or alternatively, the memory (104) may be configured to store instructions which when executed by the processor (108) causes the system 100 to behave in a manner as described in various embodiments.

The communication interface(s) (106) can facilitate multiple communications within a wide variety of networks and protocol types, including wired networks, for example, local area network (LAN), cable, etc., and wireless networks, such as Wireless LAN (WLAN), cellular, or satellite. For the purpose, the communication interface (s) (106) may include one or more ports. One or more functionalities of the system 100 and components thereof, is further explained in detail with respect to block diagram described in FIG. 2.

Figure 2:
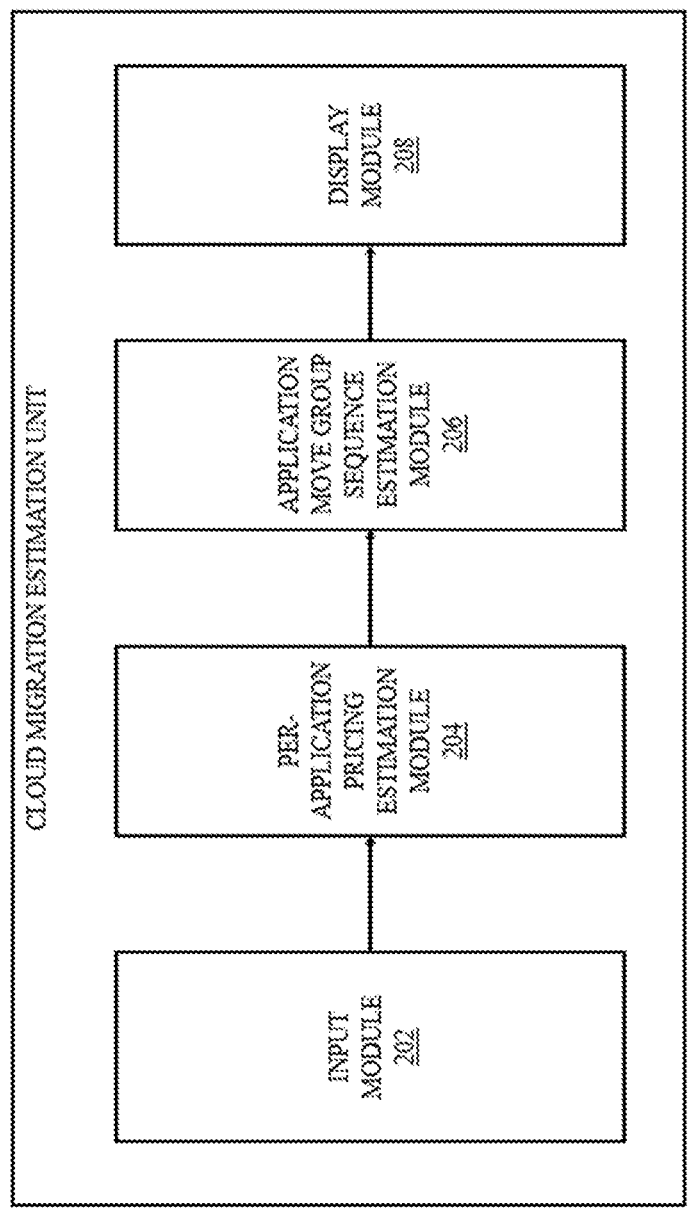
FIG. 2 is a functional block diagram of various modules stored in the system of FIG. 1 in accordance with some embodiments of the present disclosure.

FIG. 2, with reference to FIG. 1, is a block diagram of various modules of cloud migration estimation unit (102) stored in the memory (102) of the system 100 of FIG. 1 in accordance with an embodiment of the present disclosure. In an embodiment of the present disclosure, the system 100 comprises an input module (202) configured for receiving a plurality of inputs that include a plurality of applications for cloud migration, a plurality of per-application migration pricing input parameters for the received variety of applications for cloud migration and a plurality of application move group sequence input parameters corresponding to the received plurality of applications for cloud migration. The system 100 further comprises a per-application pricing estimation module (204) that is configured for estimating the per-application pricing for cloud migration for each of the received plurality of applications using the received plurality of per-application pricing input parameters based on a set of optimization techniques and neural networks. The system 100 further comprises a application move group sequence estimation module (206) configured for estimating the application move group sequence for cloud migration for each of the received plurality of applications based on a forest poly tree optimization, a fuzzy ant colony optimization, a triangular fuzzy optimization and a plurality of pre-defined priorities. The system 100 further comprises a display module (208) configured for displaying the estimated per-application migration pricing and the estimated application move group sequence for cloud migration, that are implemented as at least one of a logically self-contained part of a software program, a self-contained hardware component, and/or, a self-contained hardware component with a logically self-contained part of a software program embedded into each of the hardware component that when executed perform the above method described herein.

According to an embodiment of the disclosure, the system 100 comprises the input module (202) configured for receiving a plurality of inputs. The plurality of inputs include a plurality of applications for cloud migration, a plurality of per-application migration pricing input parameters for the received variety of applications for cloud migration and a plurality of application move group sequence input parameters corresponding to the received plurality of applications for cloud migration.

The plurality of applications received as input to the input module (202) for cloud migration include bespoke for custom applications, commercial off-the-shelf products (COTS) for which source code is unavailable. The plurality of per-application migration pricing input parameters received as input to the input module (202) include one or more of application type, platform preference, technology stack, minimal change migration, availability, scalability, integration, open source, multi cloud portability, security and modernization. The plurality of application move group sequence input parameters received as input to the input module (202) include one or more of business group, dependent application, technically coupled application, business critical, business priorities platform preference, security and compliance, hardware ageing, software support timeline, timeline restriction, minimal change migration, availability, scalability and integration.

According to an embodiment of the disclosure, the system 100 further comprises the per-application pricing estimation module (204) that is configured for estimating the per-application pricing for cloud migration for each of the received plurality of applications. The per-application pricing for cloud migration for each of the received plurality of applications is estimated using the received plurality of per-application pricing input parameters based on a set of optimization techniques and neural networks.

Figure 3:
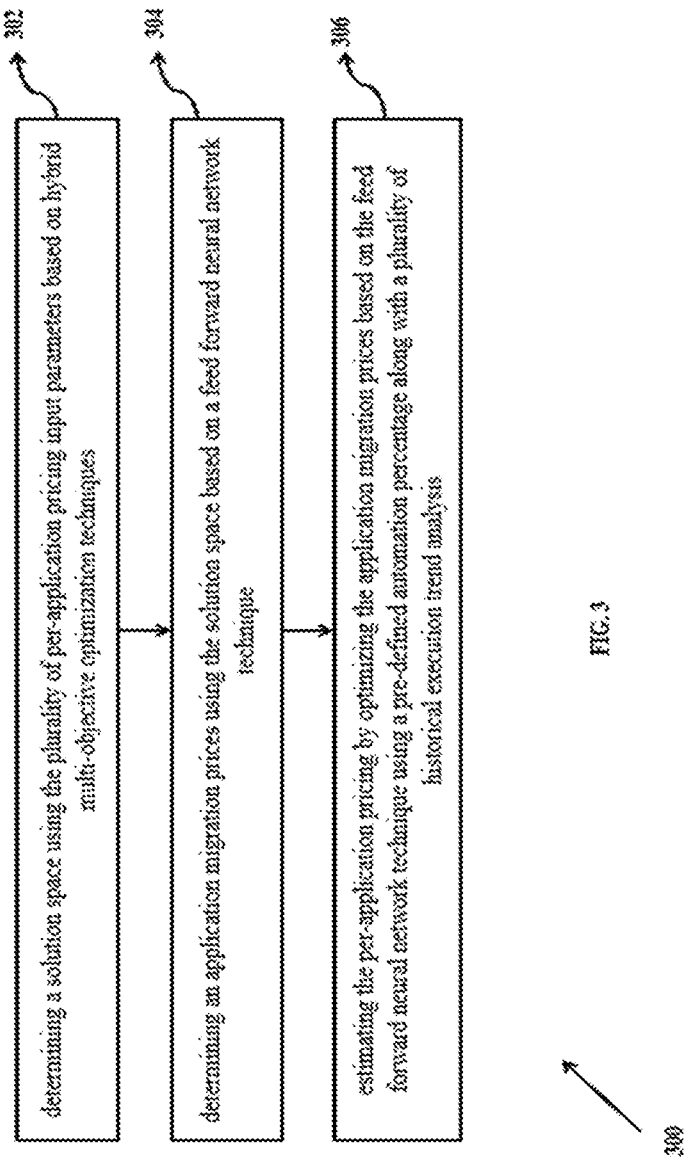
FIG. 3 is an exemplary flow diagram for estimation of per-application migration pricing for cloud migration according to some embodiments of the present disclosure.

In an embodiment, the per-application pricing is estimated for cloud migration in the per-application pricing estimation module (204) as shown as an exemplary flow diagram in FIG. 3 using the system 100 of FIG. 1.

At step 302, a solution space is determined using the plurality of per-application pricing input parameters. The solution space determined includes experienced solution space repository and present solution space. The solution space is determined based on hybrid multi-objective optimization techniques using the plurality of per-application migration pricing input parameters that include one or more of application type, platform preference, technology stack, minimal change migration, availability, scalability, integration, open source, multi cloud portability, security and modernization.

In an embodiment, the solution space is determined based on hybrid multi-objective optimization techniques. The input per-application migration pricing input parameters are pre-processed before optimization wherein the relevant/efficacy parameters are selected from the per-application migration pricing input parameters based on feature selection techniques that include Analytic Hierarchy Process (AHP). The AHP technique include assignment of weights, aggregation and final comparison to determine a relevant/ efficacy parameters and priority parameters. Further the determined relevant/efficacy parameters and priority parameters are further optimized using a Consistency Ratio that is computed by generating a priority vector, which is normalized to determine an Eigen vector and an Eigen vector of reciprocal matrix, whose consistency can be analyzed with "Principal Eigen" value. Further principal Eigen value is computed from the summation of each element of Eigen vector and sum of columns of the reciprocal matrix defined a measure of consistency called "Consistency Index" as deviation or degree of consistency using that can be expressed as shown below;

Consistency Index $(CI)=(\lambda_{max}-n)/(n-1)$

Further a Consistency Ratio is generated by comparison of Consistency Index with pre-determined Random Consistency Index and can be expressed as follows;

$CR=CI/RI$

Further in an embodiment, the efficacy parameters that are determined are shown below;
i is platform preference (i=1, . . . , I)
j is technology stack (j=1, . . . , J)
g is integration footprints (g=1, . . . , G)
m is application characteristics (m=1, . . . , M)
s is cloud adoption (s=1, . . . , S)
t is enterprise preferences (t=1, . . . , T)
r is resource utilization (r=1, . . . , R)
$i^{upstream}$ is the number of upstream integration points
$i^{downstream}$ is the number of downstream integration points
$r^{shared}$ is the number of shared resources
$rw^{shared\ database}$ is the number of shared application writing to database
$rr^{shared\ database}$ is number of shared application reading from database
dw is number of data—warehouse
$t^{application\ up\text{-}time}$ is application up time
$tech^{disperse}$ is number of disperse technology used
$\alpha_{i,j,g,s,t}$ is cloud adoption costs for platform preferences, j technology stacks and t enterprise preferences
$\beta_{m,g}$, $i^{upstream}$, $i^{downstream}$ is complexity factors for m application characteristics g integration foot prints, upstream integration points, downstream integration points
$u_r^{shared}$, $rw^{shared\ database}$, $rr^{shared\ database}$, dw is complexity factors for shared resources shared application writing to database, shared application reading from database and data—warehouse
$¥_{i,m,t}$, $tech^{disperse}$, $t^{application\ up\text{-}time}$ is the complexity factors for platform preferences, application characteristics, enterprise preferences, disperse technology, application up-time The objective function (f) for the efficacy parameters are expressed as follows;

$$f_{1,N} = \sum_{i\in I}\sum_{j\in J}\sum_{g\in G}\sum_{s\in S}\sum_{t\in T}\alpha_{i,j,g,s,t}\times tech^{disperse}+$$

$$\sum_{m\in M}\sum_{i\in I}\beta_{m,g,i^{upstream},i^{downstream}}\times\left\{\frac{(i^{upstream}+i^{downstream})\times t^{application\ up\text{-}time}}{g}\right\}+$$

$$\sum_{r\in R}\mu_{r^{shared},rw^{shared\ database},rr^{shared\ database},dw}\times$$

$$\left\{\frac{(r^{shared}+rw^{shared\ database}+rr^{shared\ database})\times t^{application\ up\text{-}time}}{r}+(dw\times t^{application\ up\text{-}time})\right\}+$$

$$\sum_{i\in I}\sum_{m\in M}\sum_{t\in T}¥_{i,m,t,tech^{disperse},t^{application\ up\text{-}time}}\times$$

$$\left\{\frac{(i^{upstream}+i^{downstream})\times t^{application\ up\text{-}time}}{g}\right\}+\left\{\frac{(r^{shared}+rw^{shared\ database}+rr^{shared\ database})\times t^{application\ -timeup}}{r}+(dw\times t^{application\ up\text{-}time})\right\}$$

$\times tech^{disperse}$

In the next step at 304, an application migration prices are determined. The application migration prices are determined using the solution space (step 302) based on a feed forward neural network technique, wherein the application migration prices are determined by comparison of experienced solution space repository and present solution space. The layers to be used in the feed forward neural network is determined based on the solution space and strength of experienced repositories.

In the next step at 306, the per-application pricing is determined. The per-application pricing is determined by optimizing the application migration prices based on the feed forward neural network technique using a pre-defined automation percentage along with a plurality of historical execution trend analysis.

According to an embodiment of the disclosure, the system 100 further comprises application move group sequence estimation module (206) configured for estimating the application move group sequence for cloud migration for each of the received plurality of applications. The application move group sequence is estimated based on a forest poly tree optimization, a fuzzy ant colony optimization, a triangular fuzzy optimization and a plurality of pre-defined priorities.

Figure 4:
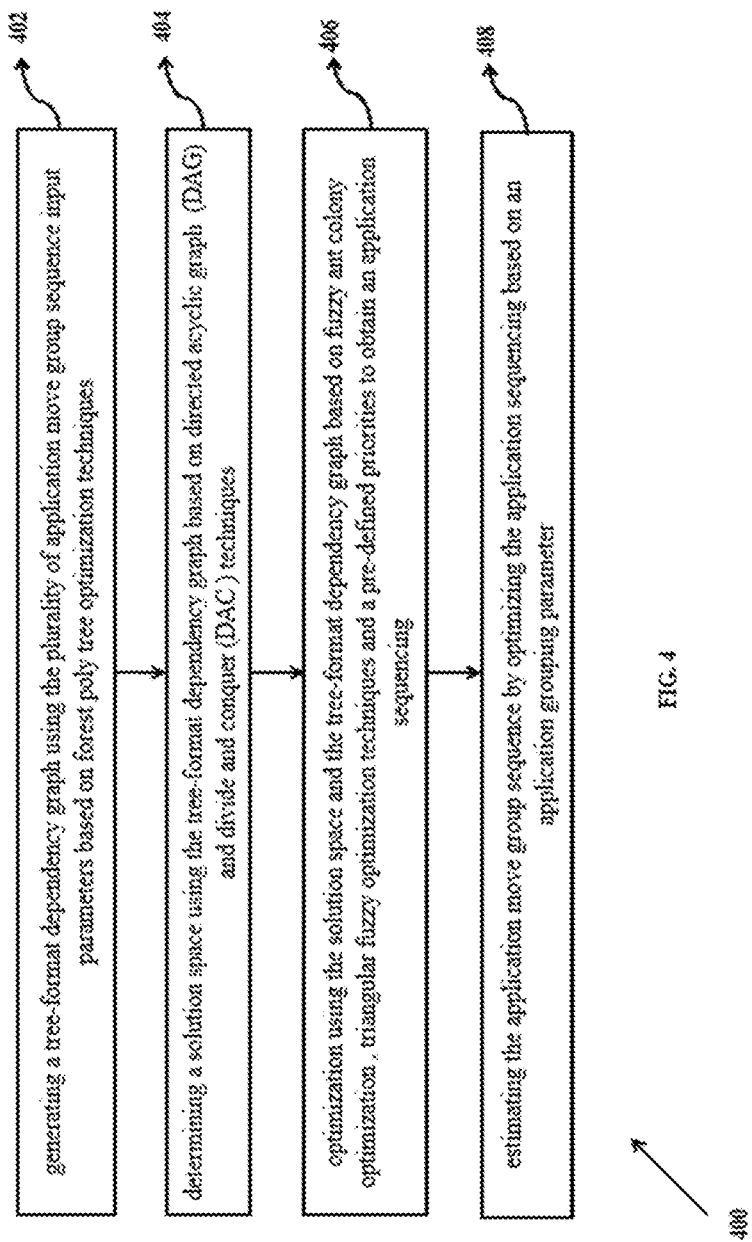
FIG. 4 is an exemplary flow diagram for estimation of application move group sequence for cloud migration according to some embodiments of the present disclosure.

In an embodiment, the application move group sequence is estimated for cloud migration in the application move group sequence estimation module (206) as shown as an exemplary flow diagram in FIG. 4 using the system 100 of FIG. 1.

At step 402, a tree-format dependency graph is generated using the plurality of application move group sequence input parameters based on forest poly tree optimization techniques. The plurality of application move group sequence input parameters received as input to the input module (202) include one or more of business group, dependent application, technically coupled application, business critical, business priorities platform preference, security and compliance, hardware ageing, software support timeline, timeline restriction, minimal change migration, availability, scalability and integration. The tree-format dependency graph generated comprises of a plurality of cycles.

In the next step at 404, a solution space is determined using the tree-format dependency graph based on directed acyclic graph (DAG) and divide and conquer (DAC) techniques. The solution space is determined from the tree-format dependency graph by optimizing the plurality of cycles in the tree-format dependency graph using DAG & DCG techniques. The optimization is implemented by first identifying all the cycles in the graph and further selecting the optimum cycle, wherein the optimum cycle is determined by the size of nodes present in each cycle.

In the next step at 406, the solution space and the tree-format dependency graph are optimized based on plurality of optimization techniques that include fuzzy ant colony optimization, triangular fuzzy optimization techniques and a pre-defined priorities to obtain an application sequencing. The pre-defined priorities include business critical, business priorities application preference.

In an embodiment, the application sequencing is identified based on fuzzy ant colony optimization (FACO) and triangular fuzzy optimization (TFO) technique by estimating weightage of the tree-format dependency graph edge between applications. Further enhanced ant colony optimization (ACO) and triangular optimization with fuzzy logics techniques are applied for tree-format dependency graph-edge weightage estimation and application grouping wherein the fuzzy membership functions represent the weightage between two application dependencies where fuzzy dependency between two applications $A_i$, $A_j$ is a triangular fuzzy number can be represented as:

$$(l_{ij}, d_{ij}, u_{ij})$$

Where
$l_{ij}=d_{ij}(1-\partial_1)$ and $0 \leq \partial_1 \leq 1$ 1, $u_{ij}=d_{ij}(1+\partial_2)$ and $\partial_2 \geq 0$ such that:
  $l_{ij}$ is the lowest value estimate for the dependency
  $d_{ij}$ is the best-guess estimate for the dependency $\mu(dij)=1.0$
$u_{ij}$ is the highest value estimate for the dependency $\partial_1$, $\partial_2$ are fuzziness factors such that:
  When $\partial_1=1$ then $l_{ij}=0$,
wherein the dependency between Ai, Aj may equal 0 which means Ai, Aj are independent
  When $\partial_1=0$ then $l_{ij}=d_{ij}$
wherein there is no fuzziness in the lower direction and the dependency between Ai, Aj may not change to any lower values.
  When $\partial_2=0$ then $u_{ij}=d_{ij}$
wherein the dependency between Ai, Aj may not change in upper direction so the dependency between Ai, Aj may not change to any higher values.
From this, it is notable:
  In case of $\partial_1=\partial_2=0$ $$l_{ij}=d_{ij}(1-0)=d_{ij}; u_{ij}=d_{ij}(1+0)=d_{ij}$$

The fuzzy triangular number ($l_{ij}$, $d_{ij}$, $u_{ij}$) becomes $d_{ij}$ which is a number and there is no upper boundaries for $\partial_2$ also the fuzziness increases in upper direction.

Further the improved Ant Colony Optimization (ACO) technique is applied for application group identification and is represented as follows using the following parameters;
$T_{ij}$ is trail intensity that indicates the intensity of the pheromone on the edge (i,j)
Trail visibility is $n_{ij}=1/d_{ij}$
α is the importance of the intensity in the probabilistic transition
β is the importance of the visibility of the trail segment
ρ is the trail persistence or evaporation rate
Q is a constant and represents the amount of pheromone laid on a trail segment employed by an ant.

The pheromone content in an edge (i,j) at time instant t, heuristic function of the desirability of dependency selection, and their control parameters determine probabilistic group selection which given by:

$$P_{ij} = \frac{(\tau_{ij}^\alpha) \times (\eta_{ij}^\beta)}{\sum_k (\tau_{ij}^a) \times (u_{ij}^b)}$$

The classical equation for updating the pheromone by ant k influenced by the fuzzy tour length as presented in following equation.

$$\Delta_{\tau_{ij}^k} = \frac{Q}{(L^k, M^k, U^k)}$$

Where $TL = (L^k, M^k, U^k)$

Therefore $$\Delta_{\tau_{ij}^k} = \left(\frac{Q}{U^k}, \frac{Q}{M^k}, \frac{Q}{L^k}\right)$$

In the next step at 408, the application move group sequence is estimated by optimizing the application sequencing based on an application grouping parameter. In an embodiment, the optimization of the application sequencing is performed by remove the non-essential cycles from within application group of the tree-format dependency graph and classification of groups. The non-essential cycles are removed from within application group by identifying breakable dependencies, break the cycles by removing the identified breakable dependencies and re-running to remove all the non-essential cycles. Further the classification of the application groups is performed by classifying the application groups into cyclic-acyclic based on defined threshold and further sequencing the group based on the evaluated group dependency.

According to an embodiment of the disclosure, the system 100 further comprises the display module (208) configured for displaying the estimated per-application migration pricing and the estimated application move group sequence for cloud migration.

Figure 5A:
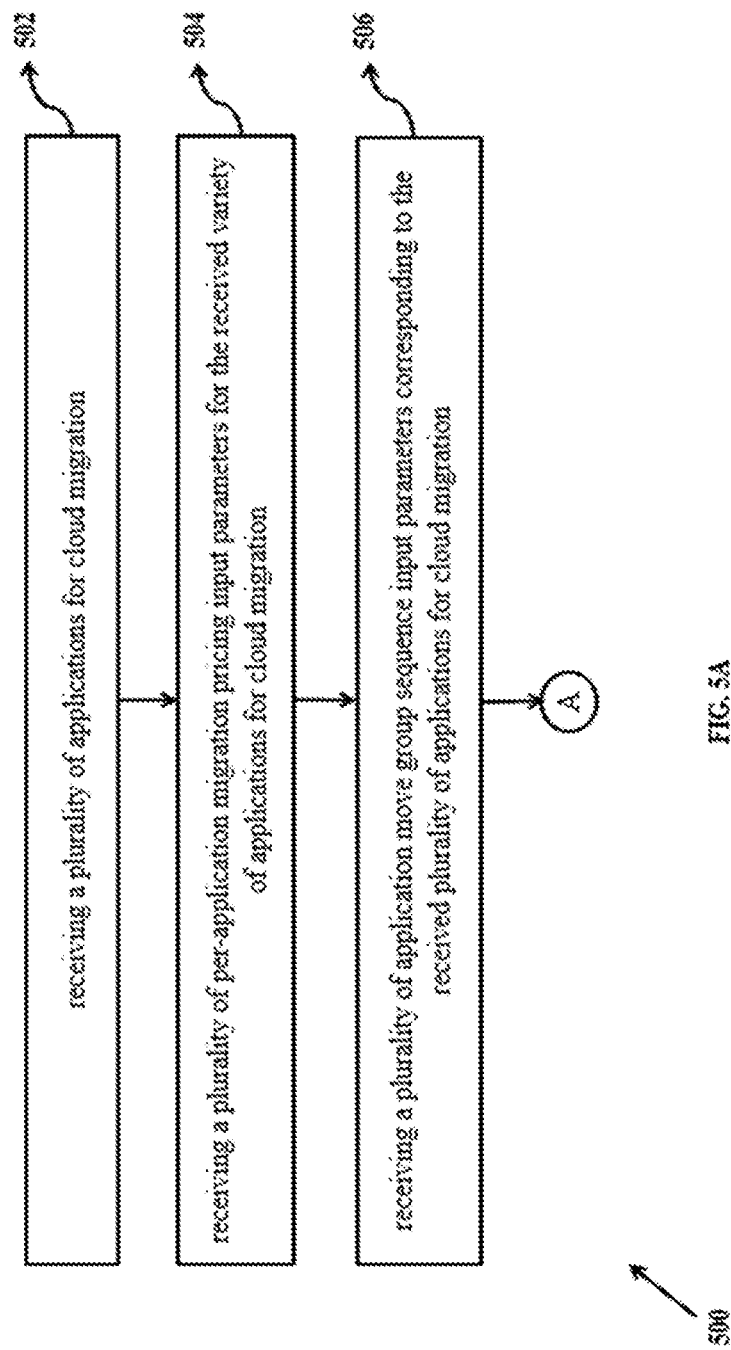
FIG. 5A and FIG. 5B is an exemplary flow diagram illustrating a method for estimation of per-application migration pricing and application move group sequence for cloud migration using the system of FIG. 1 in accordance with some embodiments of the present disclosure.
Figure 5B:
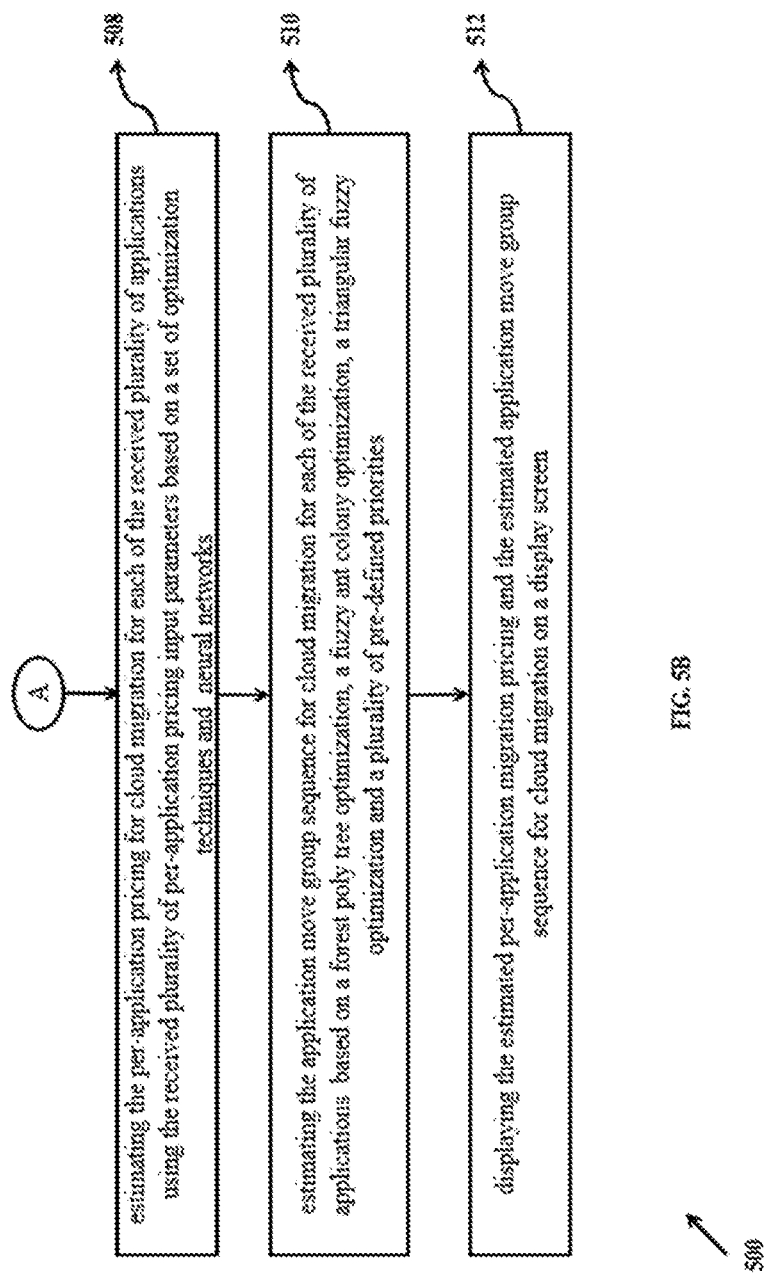

FIG. 5A and FIG. 5B, with reference to FIGS. 1-2, is an exemplary flow diagram illustrating a method for estimation of per-application migration pricing and application move group sequence for cloud migration using the system 100 of FIG. 1 according to an embodiment of the present disclosure. In an embodiment, the system 100 comprises one or more data storage devices or the memory 104 operatively coupled to the one or more hardware processors 108 and is configured to store instructions for execution of steps of the method by the one or more processors 108. The steps of the method of the present disclosure will now be explained with reference to the components of the system 100 and the modules (202-208) as depicted in FIGS. 1-2, and the flow diagram as depicted in FIG. 5A and FIG. 5B.

At step 502, a plurality of applications are received for cloud migration in the input module (202). The plurality of applications received as input to the input module (202) for cloud migration include bespoke for custom applications, commercial off-the-shelf products (COTS) for which source code is unavailable.

In the next step at 504, a plurality of per-application migration pricing input parameters is received for the received variety of applications for cloud migration in the input module (202). The plurality of per-application migration pricing input parameters received as input to the input module (202) include one or more of application type, platform preference, technology stack, minimal change migration, availability, scalability, integration, open source, multi cloud portability, security and modernization.

In the next step at 506, a plurality of per-application migration pricing input parameters is received for the received variety of applications for cloud migration the input module (202). The plurality of application move group sequence input parameters received as input to the input module (202) include one or more of business group, dependent application, technically coupled application, business critical, business priorities platform preference, security and compliance, hardware ageing, software support timeline, timeline restriction, minimal change migration, availability, scalability and integration.

In the next step at 508, the per-application pricing is estimated for cloud migration for each of the received plurality of applications in per-application pricing estimation module (204). The per-application pricing for cloud migration is estimated using the received plurality of per-application pricing input parameters based on a set of optimization techniques and neural networks. The per-application pricing is determined in multiple steps that include determining a solution space using the plurality of per-application pricing input parameters based on hybrid multi-objective optimization technique. Further an application migration prices is determined using the solution space based on a feed forward neural network technique. Further the per-application pricing is estimated by optimizing the application migration prices based on the feed forward neural network technique using a pre-defined automation percentage along with a plurality of historical execution trend analysis.

In the next step at 510, the application move group sequence is estimated for cloud migration for each of the received plurality of applications in the application move group sequence estimation module (206). The application move group sequence is estimated based on a plurality of optimization techniques that include a forest poly tree optimization, a fuzzy ant colony optimization, a triangular fuzzy optimization and a plurality of pre-defined priorities. The application move group sequence is determined in multiple steps that include generating a tree-format dependency graph using the plurality of application move group sequence input parameters based on forest poly tree optimization techniques. Further a solution space is determined using the tree-format dependency graph based on directed acyclic graph (DAG) and divide and conquer (DAC) techniques. Further the solution space and the tree-format dependency graph is optimized based on fuzzy ant colony optimization, triangular fuzzy optimization techniques and a pre-defined priorities to obtain an application sequencing and finally the application move group sequence is estimated by optimizing the application sequencing based on an application grouping parameter.

In the next step at 512, the estimated per-application migration pricing and the estimated application move group sequence for cloud migration is displayed on a display module (208).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Hence a method and a system for estimation of per-application migration pricing and application move group sequence for cloud migration is provided. The per-application migration pricing is the cost incurred to migrate an application from an organization's infrastructure to a cloud and the application move group sequence is an optimized application movement sequence from an organization's infrastructure to a cloud. The method and system propose to estimate the per-application pricing for cloud based on a set of optimization techniques and neural networks. Further the application move group sequence for cloud migration is estimated based on a forest poly tree optimization, a fuzzy ant colony optimization, a triangular fuzzy optimization and a plurality of pre-defined priorities.

It is to be understood that the scope of the protection is extended to such a program and in addition to a computer-readable means having a message there in; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor implemented method (500) to estimate a per-application migration pricing and an application move group sequence for cloud migration, the method comprising:
   receiving a plurality of applications for cloud migration (502);
   receiving a plurality of per-application migration pricing input parameters for the received plurality of applications for cloud migration (504);
   receiving a plurality of application move group sequence input parameters corresponding to the received plurality of applications for cloud migration (506);
   estimating the per-application pricing for cloud migration for each of the received plurality of applications using the received plurality of per-application pricing input parameters based on a set of optimization techniques and neural networks (508), wherein the step of estimating the per-application pricing for cloud migration for each received application further comprises:
      determining a solution space using the plurality of per-application pricing input parameters based on hybrid multi-objective optimization techniques;
      determining an application migration prices using the solution space based on a feed forward neural network technique; and
      estimating the per-application pricing by optimizing the application migration prices based on the feed forward neural network technique using a pre-defined automation percentage along with a plurality of historical execution trend analysis;
   estimating the application move group sequence for cloud migration for each of the received plurality of applications based on plurality of optimization techniques that include a forest poly tree optimization, a fuzzy ant colony optimization, a triangular fuzzy optimization and a plurality of pre-defined priorities (510); and
      displaying the estimated per-application migration pricing and the estimated application move group sequence for cloud migration on a display module (512).

2. The method of claim 1, wherein the received a plurality of applications for cloud migration include bespoke for custom applications, commercial off-the-shelf products (COTS) for which source code is unavailable.

3. The method of claim 1, wherein the plurality of per-application migration pricing input parameters include one or more of application type, platform preference, technology stack, minimal change migration, availability, scalability, integration, open source, multi cloud portability, security and modernization.

4. The method of claim 1, wherein the plurality of application move group sequence input parameters include one or more of business group, dependent application, technically coupled application, business critical, business priorities platform preference, security and compliance, hardware ageing, software support timeline, timeline restriction, minimal change migration, availability, scalability and integration.

5. The method of claim 1, wherein solution space includes experienced solution space repository and present solution space.

6. The method of claim 1, wherein application migration prices are determined by comparison of experienced solution space repository and present solution space.

7. The method of claim 1, wherein the step of estimating application move group sequence for cloud migration further comprises:
   generating a tree-format dependency graph using the plurality of application move group sequence input parameters based on forest poly tree optimization techniques;
   determining a solution space using the tree-format dependency graph based on directed acyclic graph (DAG) and divide and conquer (DAC) techniques;
   optimization using the solution space and the tree-format dependency graph based on fuzzy ant colony optimization, triangular fuzzy optimization techniques and a pre-defined priorities to obtain an application sequencing; and
   estimating the application move group sequence by optimizing the application sequencing based on an application grouping parameter.

8. The method of claim 7, wherein the pre-defined priorities include business critical, business priorities application preference.

9. A system comprising:
   a cloud migration estimation unit (102) to estimate a per-application migration pricing and an application move group sequence for cloud migration;
   a memory (104) for storing instructions;
   one or more communication interfaces (106);
   one or more hardware processors (108) communicatively coupled to the memory using the one or more communication interfaces, wherein the one or more hardware processors are configured by the instructions to execute the one or more modules of the cloud migration estimation unit (102) to estimate a per-application migration pricing and an application move group sequence for cloud migration, the system comprising:
      an input module (202) configured for receiving:
         a plurality of applications for cloud migration;
         a plurality of per-application migration pricing input parameters for the received variety of applications for cloud migration; and
         a plurality of application move group sequence input parameters corresponding to the received plurality of applications for cloud migration;
      a per-application pricing estimation module (204) configured for estimating the per-application pricing for cloud migration for each of the received plurality of applications using the received plurality of per-application pricing input parameters based on a set of optimization techniques and neural networks wherein the per-application pricing estimation module (204) is further configured to
- determine a solution space using the plurality of per-application pricing input parameters based on hybrid multi-objective optimization techniques;
- determine an application migration prices using the solution space based on a feed forward neural network technique; and
- estimate the per-application pricing by optimizing the application migration prices based on the feed forward neural network technique using a pre-defined automation percentage along with a plurality of historical execution trend analysis;
- a application move group sequence estimation module (206) configured for estimating the application move group sequence for cloud migration for each of the received plurality of applications based on a forest poly tree optimization, a fuzzy ant colony optimization, a triangular fuzzy optimization and a plurality of pre-defined priorities; and
- a display module (208) configured for displaying the estimated per-application migration pricing and the estimated application move group sequence for cloud migration.

10. A non-transitory computer-readable medium having embodied thereon a computer readable program, wherein the computer readable program, when executed by one or more hardware processors, cause:
- receiving a plurality of applications for cloud migration;
- receiving a plurality of per-application migration pricing input parameters for the received plurality of applications for cloud migration;
- receiving a plurality of application move group sequence input parameters corresponding to the received plurality of applications for cloud migration;
- estimating the per-application pricing for cloud migration for each of the received plurality of applications using the received plurality of per-application pricing input parameters based on a set of optimization techniques and neural networks, wherein the step of estimating the per-application pricing for cloud migration for each received application further comprises:
  - determining a solution space using the plurality of per-application pricing input parameters based on hybrid multi-objective optimization techniques;
  - determining an application migration prices using the solution space based on a feed forward neural network technique; and
  - estimating the per-application pricing by optimizing the application migration prices based on the feed forward neural network technique using a pre-defined automation percentage along with a plurality of historical execution trend analysis;
- estimating the application move group sequence for cloud migration for each of the received plurality of applications based on plurality of optimization techniques that include a forest poly tree optimization, a fuzzy ant colony optimization, a triangular fuzzy optimization and a plurality of pre-defined priorities; and
- displaying the estimated per-application migration pricing and the estimated application move group sequence for cloud migration on a display module.

\* \* \* \* \*